US009633669B2

(12) United States Patent
Salvador et al.

(10) Patent No.: US 9,633,669 B2
(45) Date of Patent: Apr. 25, 2017

(54) SMART CIRCULAR AUDIO BUFFER

(71) Applicant: Amazon Technologies, Inc., Reno, NV (US)

(72) Inventors: Stan Weidner Salvador, Tega City, SC (US); Thomas Schaaf, Pittsburgh, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 651 days.

(21) Appl. No.: 14/016,403

(22) Filed: Sep. 3, 2013

(65) Prior Publication Data
US 2015/0066494 A1 Mar. 5, 2015

(51) Int. Cl.
| *G10L 21/00* | (2013.01) |
| *G10L 21/02* | (2013.01) |
| *G06F 17/28* | (2006.01) |
| *H04L 1/18* | (2006.01) |
| *G10L 17/00* | (2013.01) |
| *G10L 25/78* | (2013.01) |
| *G10L 21/0208* | (2013.01) |

(52) U.S. Cl.
CPC ...... *G10L 21/0202* (2013.01); *G06F 17/2872* (2013.01); *G10L 21/00* (2013.01); *H04L 1/1874* (2013.01); *G10L 17/00* (2013.01); *G10L 21/0208* (2013.01); *G10L 25/78* (2013.01)

(58) Field of Classification Search
CPC ..... G06F 3/16; G10L 19/018; G10L 827/105; G10L 827/34; G11B 27/105; G11B 27/34; H04H 60/37; H04H 60/46; H04L 67/142; H04L 67/146; H04R 2420/07; H04R 29/00
USPC ............ 704/233, 201, 275; 700/94; 381/92; 455/185.1; 715/733, 747, 765
See application file for complete search history.

(56) References Cited

U.S. PATENT DOCUMENTS 6,044,434 A    3/2000   Oliver
6,587,127 B1 *   7/2003   Leeke .................. G06Q 20/123
                                                    715/733

(Continued)

FOREIGN PATENT DOCUMENTS

EP        1168302 A2    1/2002
EP        2801974 A2   11/2014

(Continued)

OTHER PUBLICATIONS

International Search Report of PCT/US2014/52925, Mailed Nov. 21, 2014, Applicant: Amazon Technologies, Inc., 3 pages.

(Continued)

*Primary Examiner* — Vijay B Chawan
(74) *Attorney, Agent, or Firm* — Seyfarth Shaw LLP; Ilan N. Barzilay; Tyrus S. Cartwright

(57) ABSTRACT

An audio buffer is used to capture audio in anticipation of a user command to do so. Sensors and processor activity may be monitored, looking for indicia suggesting that the user command may be forthcoming. Upon detecting such indicia, a circular buffer is activated. Audio correction may be applied to the audio stored in the circular buffer. After receiving the user command instructing the device to process or record audio, at least a portion of the audio that was stored in the buffer before the command is combined with audio received after the command. The combined audio may then be processed, transmitted or stored.

20 Claims, 8 Drawing Sheets

(56) References Cited

U.S. PATENT DOCUMENTS

| | | | |
|---|---|---|---|
| 8,886,545 B2* | 11/2014 | Meisel | G10L 15/22 |
| | | | 704/275 |
| 2003/0004729 A1 | 1/2003 | Allen et al. | |
| 2003/0228855 A1* | 12/2003 | Herz | H04B 1/08 |
| | | | 455/185.1 |
| 2006/0241948 A1 | 10/2006 | Abrash et al. | |
| 2008/0172228 A1 | 7/2008 | Comerford | |
| 2008/0253583 A1* | 10/2008 | Goldstein | H04R 1/1091 |
| | | | 381/92 |
| 2012/0100895 A1 | 4/2012 | Priyantha | |
| 2013/0138231 A1* | 5/2013 | McKenna | H04H 20/31 |
| | | | 700/94 |

FOREIGN PATENT DOCUMENTS

| | | |
|---|---|---|
| JP | 02184915 A | 7/1990 |
| JP | 2003345390 A | 12/2003 |

OTHER PUBLICATIONS

Extended European Search Report, Mailed Mar. 8, 2017, Applicant: Amazon Technologies, Inc., 7 pages.

\* cited by examiner

SMART CIRCULAR AUDIO BUFFER

BACKGROUND

Many electronic devices can store and process audio. Some have buttons and touch sensitive display screens that can be used to indicate when the device should store or process the audio. Hardware and software support is often provided for speech recognition and digital signal processing.

BRIEF DESCRIPTION OF DRAWINGS

For a more complete understanding of the present disclosure, reference is now made to the following description taken in conjunction with the accompanying drawings.

DETAILED DESCRIPTION

Figure 1:
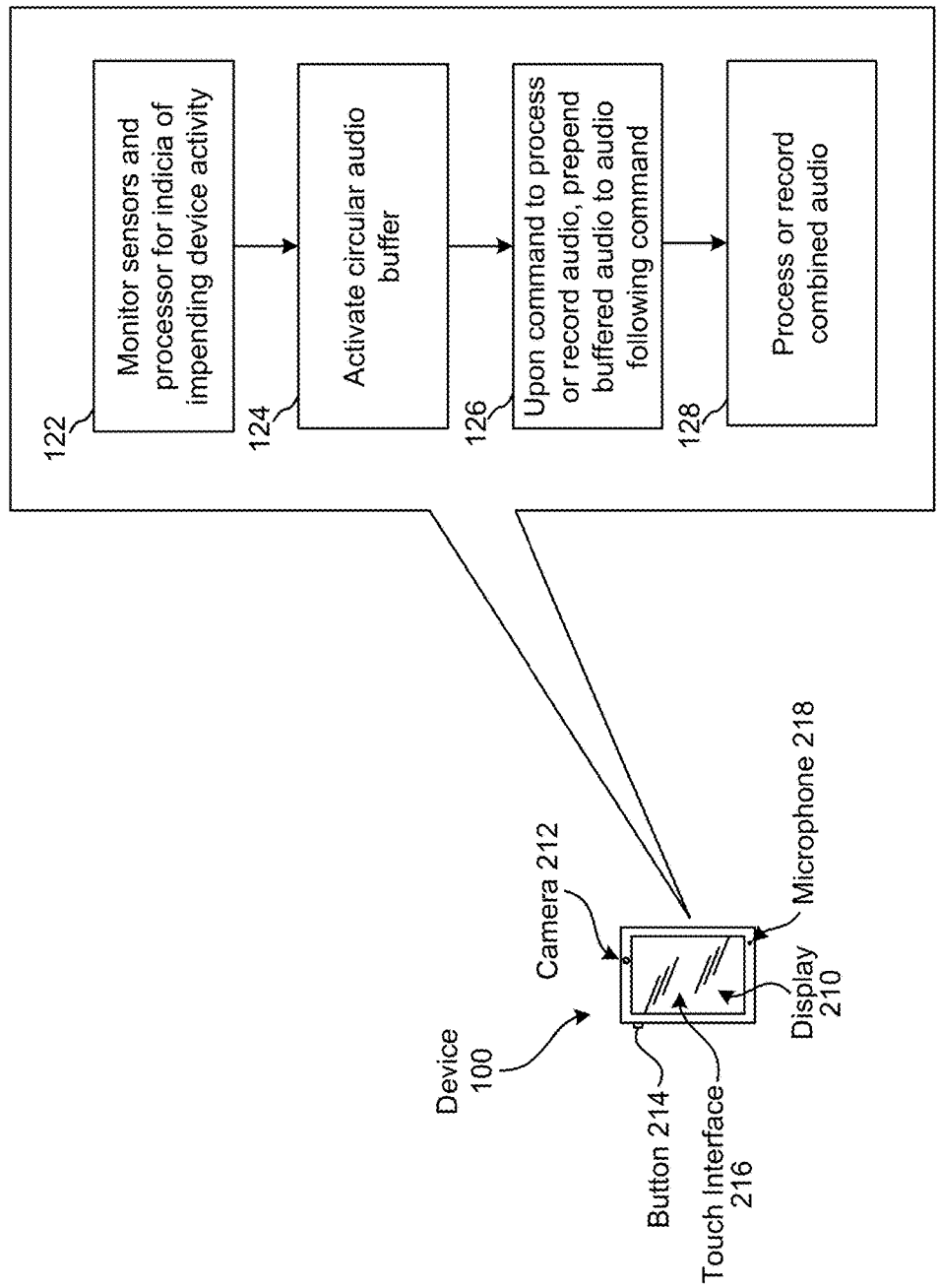
FIG. 1 illustrates operation of a device including a smart buffer.

Processing and recording audio on an electronic device entails varying degrees of power consumption. To minimize consumption on battery-powered devices, processing or recording may be minimized, absent a user command to do so. Unfortunately, particularly when the audio is speech, there may be a time offset between a user starting to speak and the start of processing or recording following the user command, This time offset may result in clipping the beginning of the audio. The time-delay offset that creates the clipping may be due to when the user actually signals to begin processing or recording, as well as due to hardware delay. In addition, people often start talking slightly before actually completing the command, such as when they begin speaking prior to fully pushing a button to begin recording.

Adding a smart audio buffer to the device may eliminate this clipping by selectively capturing audio in anticipation of the user command. Sensors and processor activity may be monitored, looking for indicia suggesting that the user command may be forthcoming. Upon detecting such indicia, a circular buffer is activated. The audio stored in the circular buffer may be downsampled, such as by decimation, to reduce power consumption. After receiving the user command instructing the device to process or record audio, at least a portion of the audio that was stored in the buffer before the command is combined with audio received after the command. The combined audio may then be processed or stored without clipping the beginning of the audio that the user desired to record.

Further, if the audio is used for streaming speech recognition, accuracy may be improved by including a short period of audio prior to the user command to allow for channel and/or environmental compensation. A short period of silence before the speech begins enables the audio channel to be normalized, improving the ability of a speech recognition system to distinguish spoken words from background and ambient noise. This is particularly advantageous when performing speech recognition on streaming audio as the audio is received, in comparison to batch processing audio after the entire stream is received, as batch processing can sample all (or a large portion) of the batch to normalize the audio prior to processing, whereas there may be no-preexisting sample from which to normalize when processing a live stream. Audio prior to the user's speech can also be used to perform other channel/environmental adaptations that can be applied to the user's speech, such as adjusting gain.

By adding the circular audio buffer to an audio-capture system, speech and other sounds that occurred prior to receipt of the user command may be stored, so that when the user command signal is received, a sample of the prior audio may be prepended to (concatenated with) the audio received after receipt of the user command. The signal to begin audio processing (and to prepend the buffered audio) may include pushing a button, otherwise physically interacting with a device (for example, by shaking the device), gesturing to the device, issuing a spoken command to a device to begin recording/processing audio, or through some other command. The signal may also include a less explicit indication, such as the user commencing speaking without explicitly commanding the device to begin recording/processing.

While the buffer may always be running, there may be a power consumption advantage to activating the buffer only when there is a relatively high chance that a user command might be received. For example, a user command might be forthcoming when an application related to capturing and recording or processing audio or speech is first opened, or when a device is picked up, or when there is a change in light intensity in front of a device (indicating movement of or near the device, placing it nearby to a potential user).

Conventionally, when audio is digitized for storage or streaming, it is "sampled" at a rate at least twice the highest frequency that may be reproduced (in accordance with the Nyquist/Shannon theorem). So, for example, if you want to reproduce sounds with frequencies up to 20,000 cycles-per-second (the normal limit of human hearing), a digital "sample" of the amplitude of the audio signal may be taken at least 40,000 times a second. Each "sample" is a digital representation of the magnitude of the amplitude of the audio waveform at the instant the sample was taken. The digital samples may then be used to reconstruct a representation of the original audio waveform. For reference, audio for a compact disc is typically sampled at 44,100 samples for each second of audio. Stored audio and streams using formats such as MP3 (Moving Picture Experts Group MPEG-1 Audio Layer III) may use similar sampling rates (adding "lossy" compression techniques to reduce the total amount of data). Telephone systems may use lower sampling rates such as 8,000 sample-per-second, since the emphasis is on capturing the human speech, which usually has an upper limit of 3,400 cycles-per-second. Encoding techniques such as delta modulation require much higher sampling rates (e.g., 32 million samples-per-second) as each sample is only stored as a single "0" or "1" to represent whether the amplitude has increased or decreased relative to the previous sample (rather than a digital representation of the instantaneous amplitude at the moment the sample was taken).

However, the principle that lowering the sampling rate reduces the highest frequency that can faithfully reproduced also applies.

To conserve battery power, the audio recorded by the buffer prior to the button push can be sampled at a lower rate than subsequent speech, or be downsampled using a technique such as decimation. Decimation stores only every Nth sample of the original audio stream (e.g., 1 in every 10 samples is stored).

Several approaches may be used to determine how much of the buffered audio should be concatenated onto the audio received after the user command. For example, a set amount of time such as one-half second of buffer audio may be used. As another example, the amount of time may be adaptively selected based on determining a period of "silence" occurring within a longer time period (e.g., one second), such as looking for the beginning of a word within the most recent second of buffered audio. An opening period of ambient background noise prior to speech starting may also be included in the prepended audio to facilitate speech processing.

FIG. 1 illustrates a system for intelligently buffering audio in anticipation of a user instructing a device 100 to capture audio. The device 100 monitors (122) sensors and processor operations for indicia suggesting impending audio-capture activity. Examples of the sort of indicia that may be monitored include an activation of an application that records or processes audio, a change in incident light intensity on the device, a visual detection of motion, a visual detection of a user in proximity to the device, visual recognition of a face, detection of a finger proximal to a touch-sensitive display screen, a change in device orientation (such as a change in device orientation to a particular orientation), movement of the device, detection of an ambient sound, detection of speech, and detection of a particular speaker. In addition to such indicia, the device may also consider past usage patterns relating to utilization of captured audio, such as whether a user's stored history shows a pattern of using speech-to-text dictation during certain times of day or at certain physical locations (based, for example, on global positioning and navigation services available to the device to determine location).

If a determination is made that a command to capture audio may be forthcoming, a circular buffer is activated (124). Circular buffers are first-in first-out (FIFO) buffers that continually overwrite their own contents. The buffer may be of any size, such as for example two or three seconds.

Upon receiving a signal (126) conveying the user command to process or record audio, a portion of the most recent audio stored in the buffer prior to the user command is prepended to the audio received after the user command. The combined audio is then processed or recorded (128), depending upon what type of application is utilizing the captured audio.

Control and operation of the smart buffer may be integrated into a software application that captures audio, or may be accessible to an application via an application programming interface (API) such as an operating-system level library call. However, intelligent buffering may also be implemented as a function of the device, rather than of an application, where an audio coder-decoder (codec) or audio driver seamlessly interacts with the buffer, such that the application utilizing a captured audio stream may not be informed that buffered audio has been prepended onto a received stream.

Figure 2:
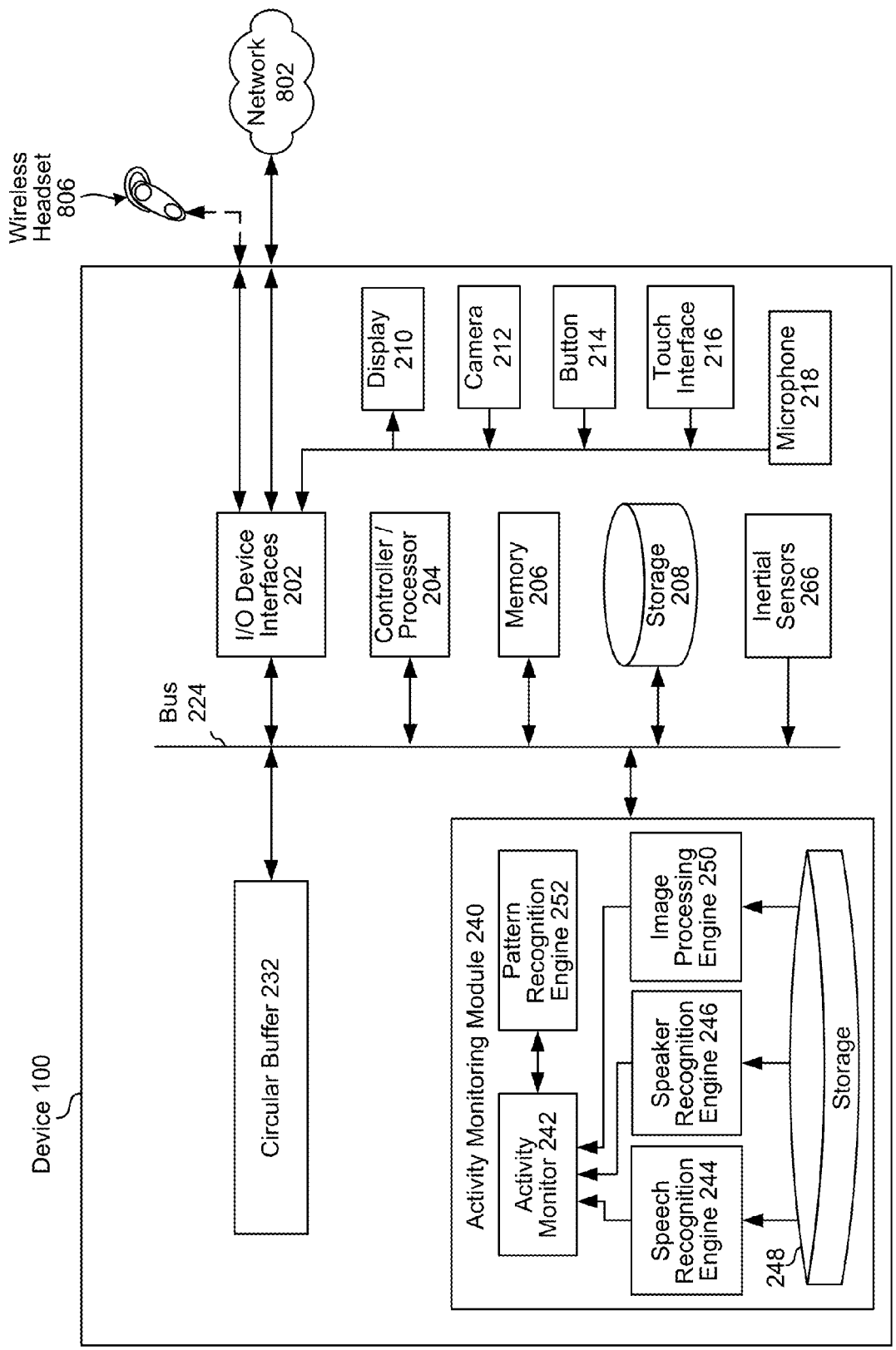
FIG. 2 is a block diagram conceptually illustrating a device including the smart buffer.

FIG. 2 is a block diagram conceptually illustrating certain components pertaining to operation of device 100. As illustrated, the device 100 includes a data bus 224 communicatively connecting various components. Components may also be connected directly in addition to (or instead of) being connected across the bus 224. Modules within device 100 may be implemented as hardware, software, or a combination thereof, as will be discussed further below.

The device 100 may include a controller/processor 204 that may include one or more central processing units (CPUs) for processing data and computer-readable instructions, and a memory 206 for storing data and instructions. The memory 206 may include volatile random access memory (RAM), non-volatile read only memory (ROM), and/or other types of memory. The device 100 may also include a non-volatile data storage component 208, for storing data and instructions. The data storage component 208 may include one or more storage types such as magnetic storage, optical storage, solid-state storage, etc. The device 100 may also be connected to removable or external memory and/or storage (such as a removable memory card, memory key drive, networked storage, etc.) through the input/output device interfaces 202. Computer instructions for operating the device 100 and its various components may be executed by the controller/processor 204 and stored in the memory 206, storage 208, an external device, or in storage 248 included in the activity monitoring module 240 discussed below. Alternatively, some or all of the executable instructions may be reduced to application-specific hardware or embedded in firmware in addition to (or instead) of software. Thus, the systems, processes, and algorithms disclosed herein may be implemented in various combinations of software, firmware, and/or hardware.

The device 100 includes input/output device interfaces 202. A variety of internal and external input/output interfaces may be included in the device 100. Example input devices include a camera 212, a push-button 214, a touch interface 216, a microphone 218, a wireless headset 806, and a global positioning (e.g., GPS, GLONASS) receiver. In addition to local input devices, other input devices may connect via a data network 802. Output devices include the display 210 and a speaker (not shown), as well as devices connected via the data network 802.

The input/output device interfaces 202 may also include external peripheral and network interfaces such as universal serial bus (USB), FireWire, Thunderbolt, and Ethernet, as well as wireless interfaces such radio frequency (RF) and infrared transceivers, Bluetooth, wireless local area networks (WLAN) such as WiFi, and cellular communication transceivers supporting protocols such as a Long Term Evolution (LTE), WiMAX, GSM, CDMA, etc. The network 802 may be the Internet and/or a private network, and may include a distributed computing environment (discussed further below with FIG. 8).

An accelerometer in inertial sensors 266 may measure the acceleration of the device 100 along an axis. A 3-axis accelerometer sensor (commonly found in many current consumer electronic devices) provides acceleration along x, y, z axes relative to the device 100. The acceleration along the x, y, z axes of the device are dependent on the orientation of the device. In other words, if the device is sitting flat on a table with the screen facing up, pushing the device from the left side so that it moves to the right will produce acceleration along the x-axis. However, if the device is turned 90 degrees counter clockwise, pushing the device from the left to right will produce a negative acceleration along the y-axis. Inertial sensors 266 may also include a gyroscope, measuring changes in rotation over time around the x, y, z axes of the device. Other sensors may also be utilized, such as a specialized gravity sensor to determine up and down, and a magnetometer to determine orientation relative to the planet's magnetic field (e.g., compass heading). These sensors may be used to detect movement of the device, which may be used as indicia of impending device activity as described below.

The device 100 may further include a circular buffer 232 for storing audio data. As noted above in the discussion of FIG. 1, the buffer may be of any size, such as two or three seconds. Circular buffers are first-in first-out (FIFO) buffers that continually overwrite their own contents. In practice, the circular buffer may be a portion of the memory 206, storage 208, storage 248, or other memory. As the buffer is used for short-term storage, volatile memory such as RAM may be used. In some systems, volatile memory may also have the benefit of lower power consumption in comparison to non-volatile memory in view of the frequent "writes" that will occur during buffering (e.g., writing to dynamic RAM uses less energy than writing to Flash storage). Software or firmware executed by processor 204 or dedicated hardware may loop through the memory locations allocated to the buffer, sequentially writing to the buffer in a circular loop.

The device 100 also includes an activity monitoring module 240. The module 240 may include an activity monitor 242. Referring back to FIG. 1, the activity monitor 242 monitors the sensors and the processor 204 for indicia of impending device activity (122) and activates the circular buffer (124). Sensors that are monitored, either directly or through intervening engines, include components such as the camera 212, the button 214, the touch interface 216, microphone 218, external components such as the wireless headset 806 (which may also include its own "button"), remote devices connected via the network 802, and the inertial sensors 266. The activity monitor may be implemented, for example, as software or firmware implemented on a processor (e.g., processor 204), or as hardware, such as finite-state machine implemented in sequential logic circuits. Operation of the activity monitor 242 will be discussed further below.

The intervening engines that support the activity monitor 242 convert complex data from the sensors into simpler forms. Examples of these intervening engines may include speech recognition engine 244, speaker recognition engine 246, and image processing engine 250. These engines may be implemented by code executed by the processor 204, or may be implemented on a remote processor via the network 802 in a distributed computing environment.

Speech recognition engine 244 may convert speech into text, provide indicia when certain words such as "command" words are recognized, and/or indicate that received audio includes speech components. Speaker recognition engine 246 compares received audio signals with stored acoustic fingerprints to identify when particular users are speaking.

Speech recognition engine 244 and speaker recognition engine 246 may be implemented, for example, as part of a classifier system configured to perform both speech recognition and acoustic fingerprint processing. Such a classifier system may be, for example, a Support Vector Machine (SVM), although other machine learning techniques might be used instead of or to augment SVM. The classifier system may utilize Hidden Markov Models (HMMs), Gaussian Mixture Models (GMMs), Mel-Frequency Cepstrum Coefficients (MFCCs), etc. The speech recognition techniques used by the speech recognition engine 244 and the acoustic fingerprints or models used by the speaker recognition engine 246 may utilize the same or similar pattern recognition systems but with different models (e.g., speech recognition may use phoneme models whereas speaker recognition may use voice print models) or may use different techniques altogether.

If the speech recognition engine 244 is configured to listen for particular "command" words, and the speaker recognition engine 246 is configured to listen for particular voices, when a match is found the classifier system may signal the activity monitor 242. This signal may be, for example, a signal to a state machine, may be a higher-level command to an application programming interface (API) sent via either the operating system of the device 100 or via an API of an application running on controller/processor 204, or may be a message sent via a network connection provided by input/output device interfaces 202. The signal may trigger a predefined interrupt of controller/processor 204. Similarly, code executing on controller/processor 204 may periodically poll the classifier system to determine whether a match has been found.

Image processing engine 250 may also be implemented as a classifier system, accessing the camera 212 and performing motion analysis and face detection (or face recognition).

The models used by these engines may be stored in storage 248, which may be dedicated storage or part of other storage such as the storage 208. For example, the speech recognition engine 244 may compare received audio with acoustic, language, and other data models and information stored in the storage 248. Models stored for speech recognition may further include data matching pronunciations of phonemes to particular words, and a dictionary of words or a lexicon, as well as data describing words that are likely to be used together in particular contexts.

The speaker recognition engine 246 may compare the audio data with one-or-more text-independent voice print signatures or models stored in storage 248 to determine whether a speaker represents a known voice. Recognized voice signatures stored in storage 248 may be generated using a training session, or may be assembled when a user uses the device for speech-related tasks.

Face detection performed by image processing engine 250 may be user-specific or non-user specific. Such face detection is increasingly included in devices offering camera functionality, and this functionality may be shared with other programs resident on the device 100 (also true for the other engines). If face recognition is used to recognize particular faces, the face model may be generated as part of the device training session, or may be assembled for example when a user takes photos of themselves.

In addition, activity monitoring module 240 may include a pattern recognition engine 252, which applies a set of dynamic models (e.g., Bayesian) and filters to identify patterns in device usage related to the recording and processing of audio and speech. For example, patterns related to time of day and/or device location where a user utilizes applications for recording and processing audio and speech. When indicia provided by sensor data and/or the other engines suggests impending activity, the pattern recognition engine may provide a probability that the indicia foreshadows the user utilizing the device to record or process audio based on past patterns of usage stored in storage 248. If the probability exceeds a threshold (a threshold that may be different for different indicia), providing sufficient commonality, the activity monitor 242 may activate the circular buffer 232. However, if the probability is below the threshold, the activity monitor 242 may forgo activation. If the probability is below the threshold but the user does activate initiate recording or processing of audio, the pattern recognition engine may modify the corresponding stored pattern and/or the threshold may be adjusted in favor of buffer activation based on the indicia in the future.

Figure 3:
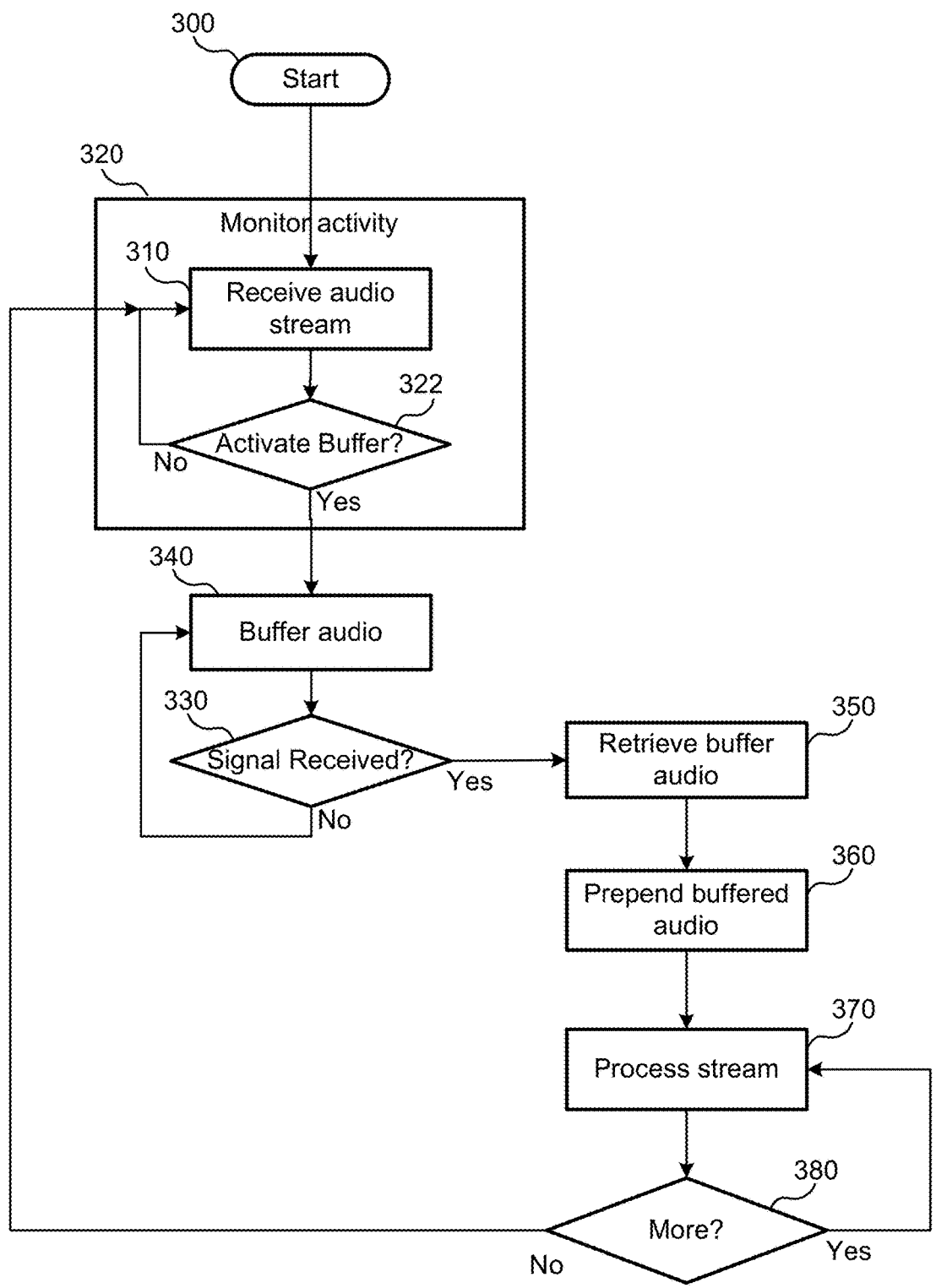
FIG. 3 illustrates example an algorithm for operation of the device including the smart buffer.

FIG. 3 illustrates an example of an algorithm for operation of the device 100. The process starts 300 and audio activity is monitored 320. During monitoring, a stream of audio data 310 is received. The audio stream may be captured audio from, among other things for example, microphone 218, headset 806, or an audio capture device connected via network 802.

The activity monitor 242 monitors activity 320 for indicia that a user command to record or process audio maybe forthcoming. This monitoring may be done in a continual loop (322 "No") until indicia is detected (322 "Yes").

Figure 4:
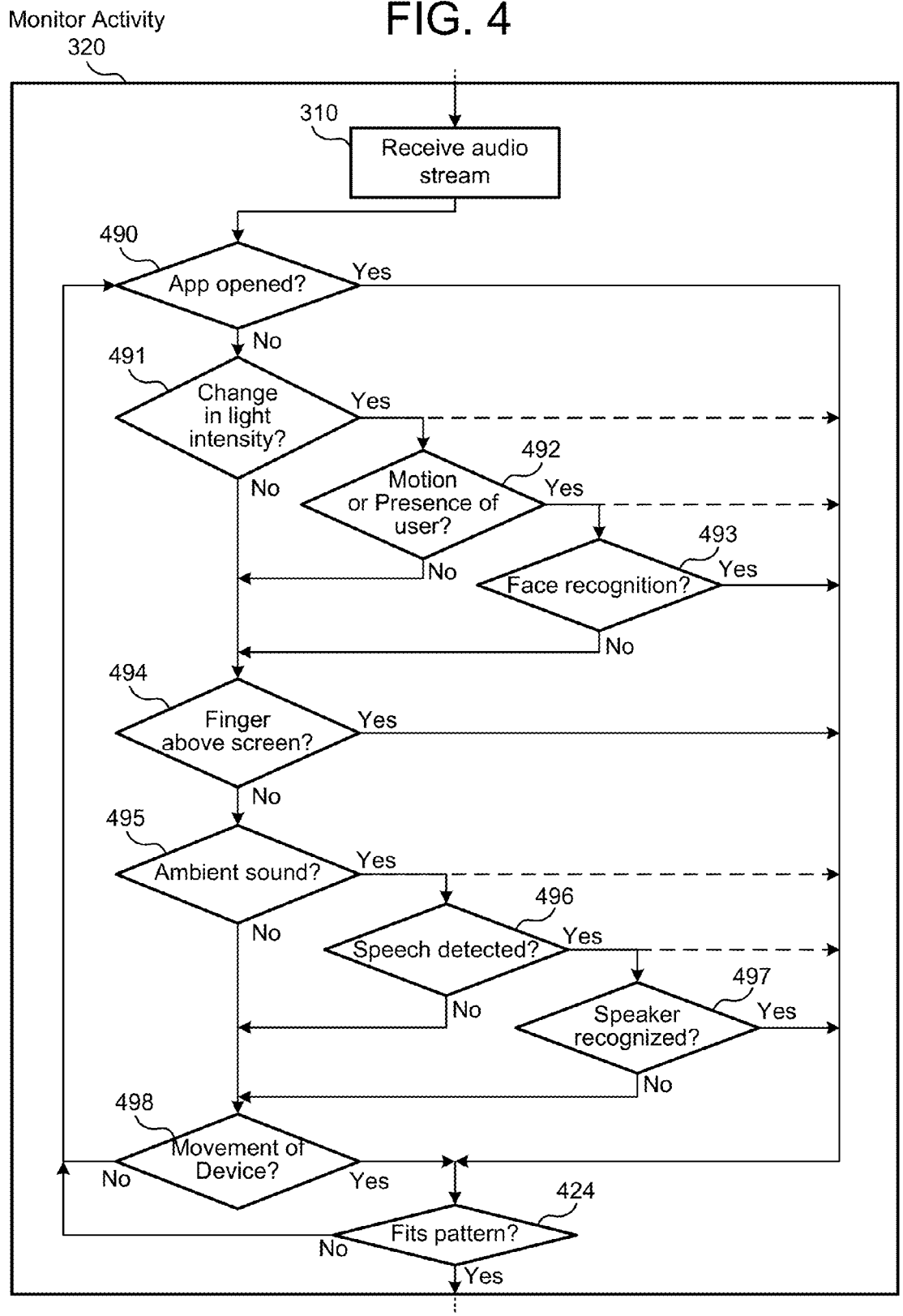
FIG. 4 illustrates a process that may be used to determine whether the smart buffer should be activated.

FIG. 4 is a more detailed example of monitoring for activity 320. Monitoring checks for various indicia whose presence may activate the buffer. Although FIG. 4 illustrates the monitoring activity 320 as a series of sequential steps, the steps may be arranged in any fashion and any one of the indicia (or other indicia) may, on its own or in combination with other indicia, result in activation of the buffer. One indicia is whether an audio capture or processing application is started (490) on the processor 204. As the application itself may or may not be configured to operate with the smart buffer, this may include having a background process running on the processor 204 watching for the activation of certain applications, and/or watching for applications opening a communications channel via bus 224 to an audio input device connected via I/O device interfaces 202.

Another indicia is watching for a change in light intensity (491). This functionality is commonly built into electronic devices that have a liquid crystal display that uses a backlight or an e-paper display that uses a front light, in order to adjust the intensity of the light. Examples of how ambient light intensity may be measured include use of one or more photocells built into the display 210, or use of the camera 212. The change in light intensity may be used as an indicia of impending activity by itself or in combination with other indicia. The change in light intensity may also be used to activate other processes that have higher levels of power consumption, such as monitoring for motion or the presence of a user (492) or face recognition (493). A sudden in change of light intensity may itself be useful as indicia, as it may indicate a user reaching for the device, with the user's hand causing the change in intensity.

Another indicia is monitoring for motion or the presence of a user (492) using a camera such as camera 212. The image processing engine 250 compares a series of images acquired via the camera to determine whether motion occurs within the camera's field of view. This may be performed as an independent process, or may be invoked in response to a change in light intensity (491) to minimize power consumption.

Another indicia is searching an acquired image for a face or head (493). Facial recognition is commonly included in mobile devices which may be used for photography, and the image processing engine 250 and the facial recognition process (493) may be a shared process utilized by photography software components. The facial recognition process may be an independent process, or may be invoked in response to a change in light intensity (491) and/or detection of motion (492) to minimize power consumption. Face and head detection may be used for among other things to determine that a user is place the device near their head to speak (e.g., alongside their head or close to their mouth).

Another indicia is when a finger is detected (494) above the interface 216 of the display screen 210. With capacitive touch panels and gesture-based display interfaces, a finger's proximity to the screen may be detected prior to contact.

Another indicia is monitoring for ambient sound (495). The ambient sound may be audio that exceeds a threshold amount of audio beyond background noise, received for example, from the microphone 218, the headset 806, or another audio input device connected via I/O device interfaces 202. The detection of ambient sound (495) may be used as indicia itself, in combination with other indicia, and/or may activate other audio analysis processes that consume greater power, such as processing the audio to detect speech (496) and/or processing the audio to detect specific speakers (497).

Another indicia is detecting speech (496). This process may be performed by speech recognition engine 244, and both the process and the engine may be shared with other processes offered by the device, such as a speech-to-text process. As performed by the activity monitoring module 240, in order to reduce power consumption, the detection of speech (496) may use a subset of speech recognition tools, such as detecting that a series of phonemes is detected rather than full conversion of the phonemes into words and sentences. This process (496) may be independent, or invoked in response to the detection of ambient sound (495) to minimize power consumption.

Another indicia is whether a particular speaker is recognized (497). Voice recognition engine 246 may compare received audio with stored voice signatures such as that of the device's owner. This process (497) maybe independent, or may be invoked in response to the detection of ambient sound (495) and/or speech detection (496) in order to minimize power consumption.

Another indicia is movement of the device (498) detected using the inertial sensors 266. The indicia may be based on any change in device motion (such as a user picking the device up) or may be based on the device being in a particular orientation, such as held upright.

If indicia is detected, the pattern recognition engine 252 may compare the occurrence of one or more indicia and current conditions (e.g., time, location), as well as activities preceding occurrence of the indicia, with past patterns of user activity preceding audio recording and/or processing. If the patterns are similar (424 "Yes"), exceeding a threshold of commonality, the process proceeds.

Returning to FIG. 3, if indicia is detected, the circular buffer 232 is activated (340). Following activation of the buffer, a check may be made to see whether a command signal from the user to record or process audio has been received (330). Although illustrated in series with the process for monitoring activity (320), the monitoring of activity (320) and monitoring for whether there has been a user command signal; (330) may operate in parallel or in a different order.

Examples of monitoring for the user command signal (330) instructing the device to process or record audio include the pressing of a physical button (e.g., the button 214), a pressing of a virtual button provided via a graphical user interface of the device, a spoken command word, or a command gesture.

If the signal has not yet been received (330 "No"), buffering continues until the user signal is received (330 "Yes"). At least a portion of the buffered audio is then retrieved from the buffer (350) and prepended (360) onto audio received after the user command. The combined audio stream is then recorded and/or processed (370), such as processing the speech into text. When the audio stream ends (e.g., the person stops talking) or signals that they are done (e.g., releasing button 214), the process restarts (380 "No").

Figure 5:
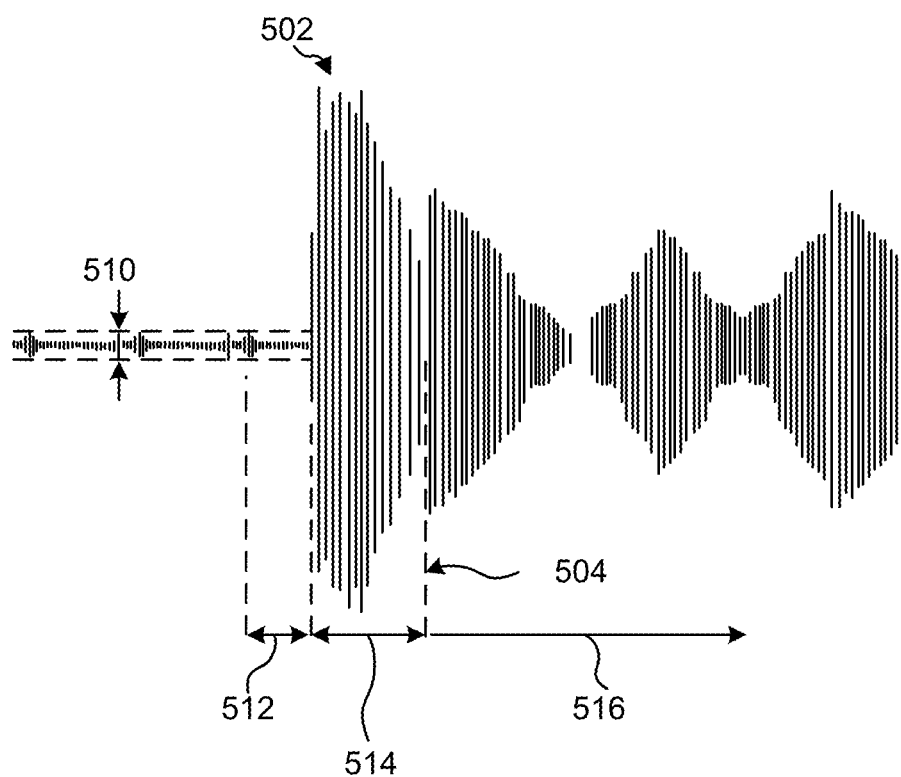
FIG. 5 illustrates an audio waveform including both audio stored in the buffer and audio received after a user command to store or process audio.

FIG. 5 illustrates a time-domain audio signal 502. The line 504 represents the point in time when the signal to record or process is received (i.e., 330), with the audio sample 516 to the right of the line 504 being audio received after the command, and the audio to the left of the line 504 being buffered audio. A fixed portion of the most recent buffered audio may be prepended (360) (e.g., the most recent half-second), or the portion used 514 may be determined by detecting where speech or the most recent word began. "Silence" is determined relative to the background ambient noise envelope 510. A portion of buffered silence 512 may be included with the sample 514 to facilitate processing (370), which may benefit the accuracy of processes such as speech recognition. The detection of sound as indicia (495 in FIG. 4) may also be relative to this ambient envelope 510.

Figure 6:
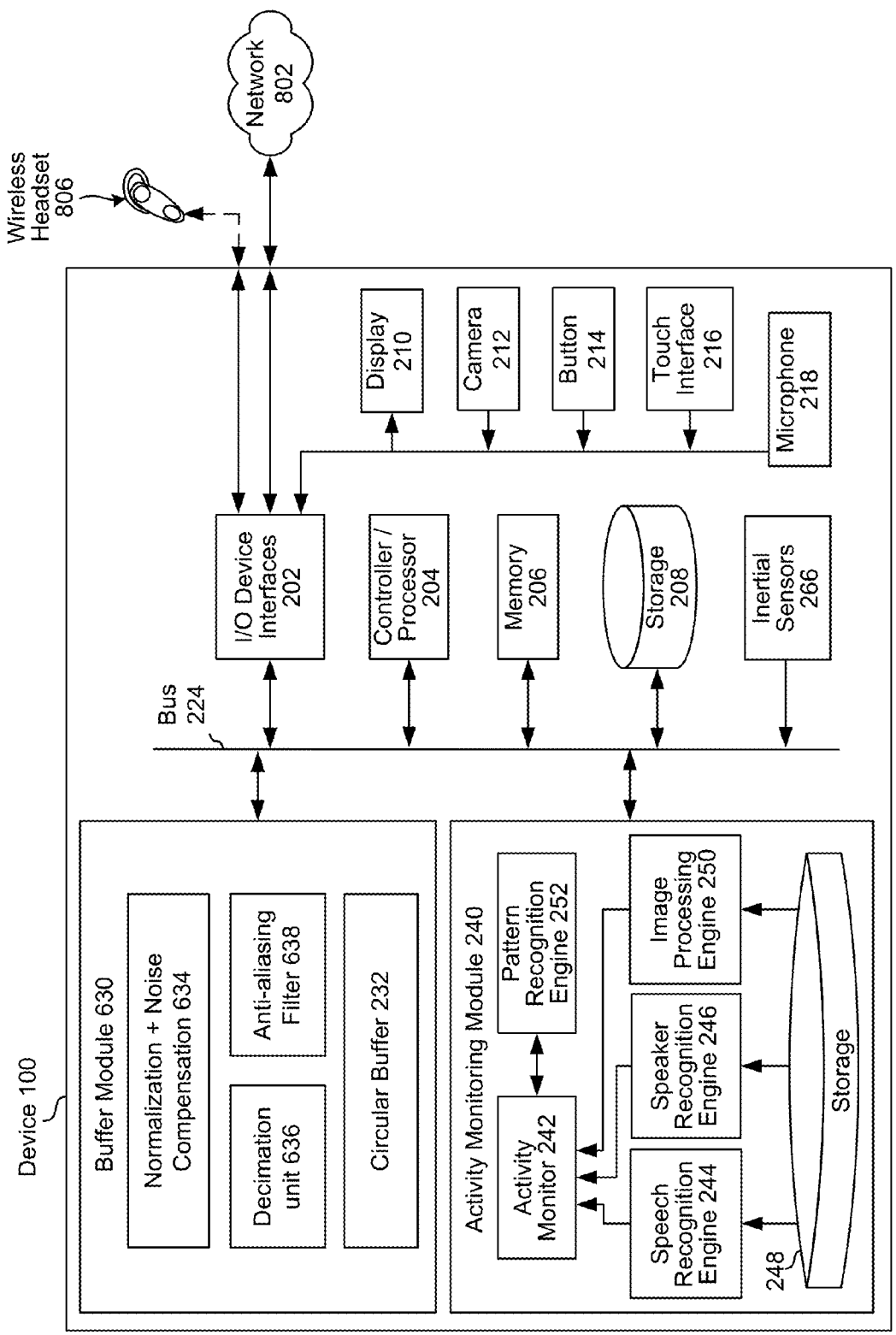
FIG. 6 is another block diagram conceptually illustrating a device including the smart buffer.
Figure 7:
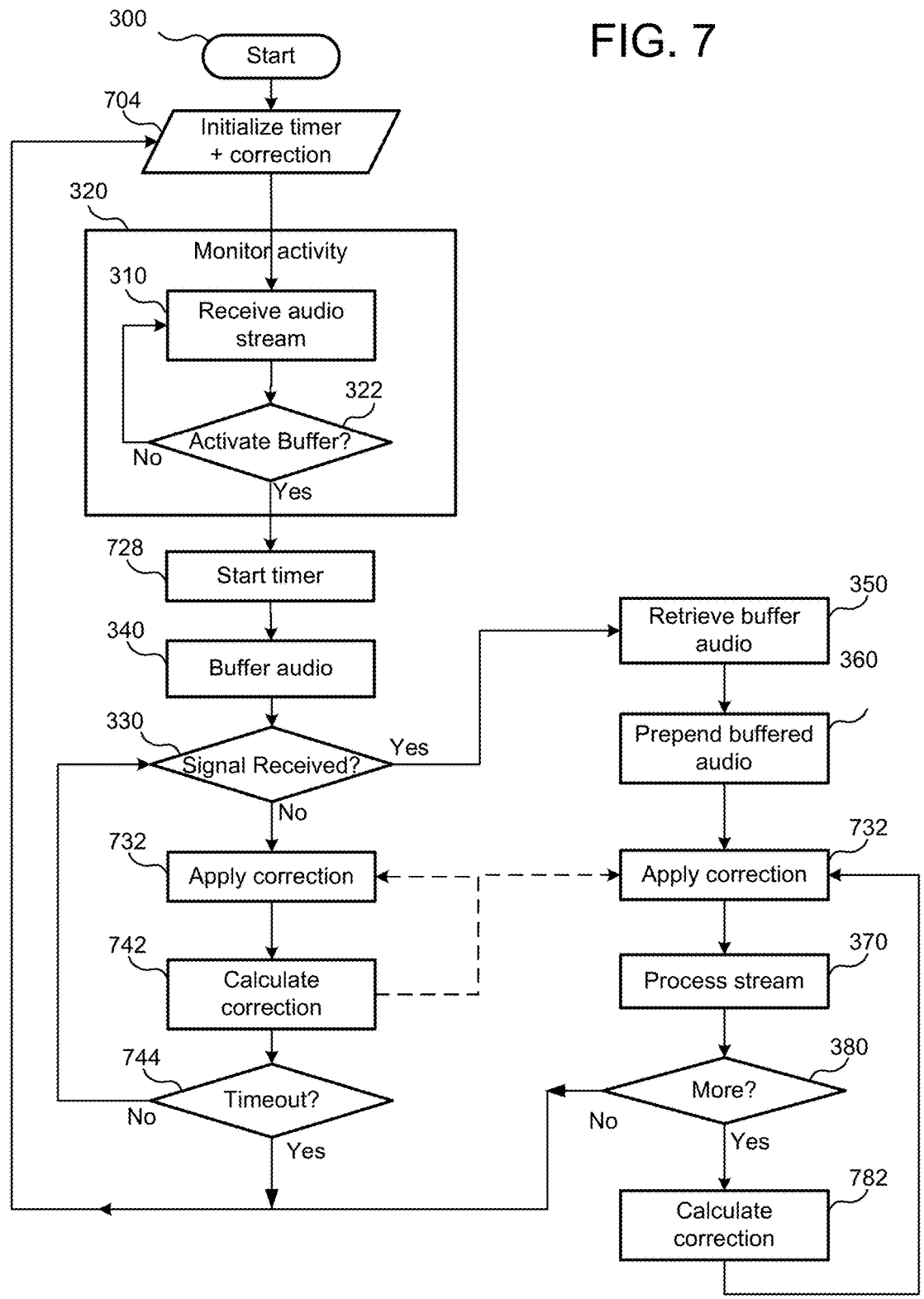
FIG. 7 illustrates another algorithm for operation of the device including the smart buffer.

FIG. 6 is a block diagram showing additional components that may be included in device 100. Circular buffer 232 is included in a buffer module 630. The buffer module 630 further includes a normalization and/or noise compensation module 634, an up/down audio sampler 636, and an anti-aliasing filter 638. FIG. 7 is a flow chart supplementing FIG. 3 illustrating use of the additional components in FIG. 6.

A first additional feature in FIG. 7 is a timer which is used to cut off the circular buffer 232 if a specified period of time transpires without receiving an indication from the user (330) to record or process received audio. The buffer is initialized (704) when the process begins, and starts counting 728 after indicia suggesting a forthcoming user command is received. Until the specified amount of time is reached (744 "No"), buffering of audio continues. If the specified amount of time has transpired (744 "Yes"), the process restarts. In addition, if power levels on the device 100 are low, the process of monitoring for indicia 320 and use of the circular buffer may be suspended to save power.

Another additional feature is the normalizing and/or applying of noise compensation (by 634) to the received audio. When the process begins, levels are initialized (704). The correction is applied (732) to the buffered audio, and corrections may be continually calculated (742) over time to further adjust the correction, using a larger portion (e.g., the entire buffer) of the buffered audio than is prepended onto the post-user-command stream. In addition to channel normalization and noise reduction, the gain applied to received audio may be adjusted (e.g., to prevent audio "clipping"). Channel normalization may include calculating the cepstra, that is the speech recognition features for an audio frame, averaging the cepstral vector over a period of time, and determining the cepstral variance over time. The cepstral variance and mean may be used to reduce effects of background noise to normalize the audio channel. Other noise compensation techniques may also be applied.

In one aspect a device or audio processing system may incorporate more than one circular buffer. The buffers may be of different lengths and be used for different purposes. For example, a long buffer may be used to take a more extended sample of audio conditions experienced by the device, thereby resulting in audio corrections (such as channel normalization, etc.) that are based on longer condition samples. A shorter buffer may be used to actually store audio which will be prepended to user speech for speech recognition processing. In one aspect, a longer range buffer may store statistics related to the audio performance over the time frame corresponding to the longer range buffer. Further, the longer range buffer may perform frame/time-base decimation (where the microphone is turned off/on during certain intervals but audio is sampled at a normal rate) and/or sample rate decimation.

A difference between this and conventional audio level adjustments is that corrections calculated before the user command to record or process audio may be applied to audio received after the command, providing continuity in audio quality between buffered and live audio, and providing corrected levels from the beginning of the stream.

Another additional feature is using decimation when buffering audio. This may be accomplished by using decimation unit 636 to store only some of the audio sample in the circular buffer 232. For example, the decimation unit 636 may only store only every N audio samples (e.g., 1 of 10) in the buffer.

Figure 8:
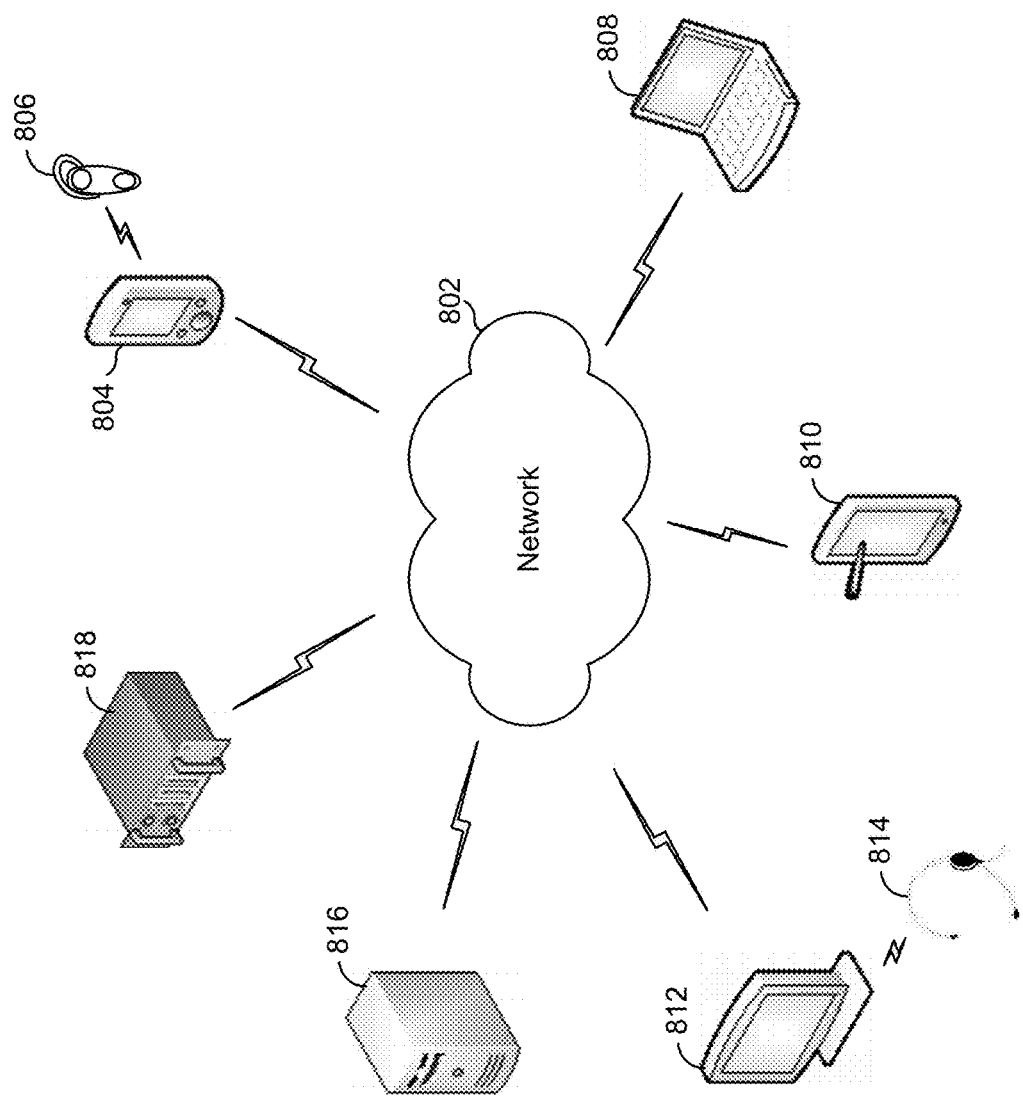
FIG. 8 illustrates an example of a computer network for use with the smart buffer.

While the components of the smart buffer system discussed above are mostly resident within device 100, the components may also be arranged in a distributed computing environment. For example, buffer module 630 and/or the activity monitoring module 240 may be resident in another device connected via network 802. In addition, some or all of the processing (370) may be performed on a processor connected to device 100 via the network 802. For example, as shown in FIG. 8, wireless device 804, wireless headset 806, laptop 808, tablet computer 810, terminal 812, wired headset 814, and/or computer 816 may acquire the audio stream, include the user interface, and contain the inertial sensors 266, whereas a server 818 connected via network 802 may perform computational aspects of buffer module 630, activity monitoring module 240, and/or data recording and processing (370). Such a distributed environment allows a network-connected device with limited computational and storage capability to benefit from the advantages of a smart buffer.

The systems in FIGS. 2 and 6 may include computer-readable and computer-executable instructions for implementing the processes illustrated in FIGS. 1, 3, 4, and 7. Such instructions may be stored in non-volatile computer-readable storage 208 and/or 248.

While the components in FIGS. 2 and 6 may be included in system 100, other non-illustrated components may also be included. Also, some of the illustrated components may not be present in every device capable of employing the general concepts of the smart buffer system. Further, some components that are illustrated in the device 100 as a single component may appear multiple times in a single device. For example, the device 100 may include multiple input/output device interfaces 202 or multiple controllers/processors 204.

Multiple circular buffers 232, active monitoring modules 240, and buffer modules 630 may be employed in a system implementing the processes illustrated in FIGS. 1, 3, 4, and 7. In such a multi-device system, the device 100 may include different components for performing different aspects of the these process. The multiple devices may include overlapping components. The device 100 as illustrated in FIGS. 1, 2, and 6 is exemplary, and may be a stand-alone device or may be included, in whole or in part, as a component of a larger device or system.

The concepts disclosed herein may be applied within a number of different devices and computer systems, including, for example, digital cameras, cellular phones, personal digital assistants (PDAs), tablet computers, wearable computers with a head-mounted camera and display, other mobile devices, etc. The components of device 100 may also be a component of other devices or systems that may provide smart buffer capability, including a general-purpose computing systems, server-client computing systems, mainframe computing systems, telephone computing systems, laptop computers, etc.

Various components may be used with the device 100, either in whole or in part. For example, the camera 212 may include a charge-coupled device (CCD) image sensor or an active-pixel sensor (APS) for capturing an images. The display 210 any suitable technology, such as a liquid crystal display, an organic light emitting diode display, electronic paper, an electrochromic display, a cathode ray tube display, a field emission display, a pico projector or other suitable components for displaying images and/or video. The devices 210 to 218 may each be integrated within the device 100 or may be separate.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer method, a system or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method of buffering audio on an electronic device, comprising:
    detecting, at a first time, a first indication of impending device activity, the indicator comprising one or more of an activation of an application that processes audio, a change in incident light intensity, a visual recognition of motion, a visual recognition of a user in proximity to the electronic device, visual recognition of a face, a finger proximal to a touch-sensitive display screen, movement of the electronic device, ambient sound, speech, or recognition of a particular speaker;
    receiving, starting at a second time after the first time, audio corresponding to an utterance;
    storing audio data corresponding to the audio in a circular buffer, based at least in part on detecting the first indication;
    receiving, at a third time after the second time, a second indication to process audio; and
    in response to receiving the second indication:
        combining, into combined audio data, at least a portion of the audio data corresponding to the utterance and stored in the circular buffer prior to receiving the second indication with further audio data corresponding to further audio received after receiving the second indication; and
        sending the combined audio data for processing.

2. The method of claim 1, further comprising generating the second indication in response to detecting a pressing of a physical button, a pressing of a virtual button provided via a graphical user interface, or a command gesture.

3. The method of claim 1, further comprising:
    calculating an audio correction to be applied to the received audio, in response to detecting the first indication and before receiving the second indication; and
    applying the audio correction to audio data received after the second indication.

4. The method of claim 3, wherein the audio correction comprises one or more of channel normalization or noise reduction.

5. A computing device, comprising:
    at least one processor;
    a memory device including instructions operable to be executed by the at least one processor to perform a set of actions, configuring the at least one processor to:
        detect, at a first time, an indicator of impending device activity;
        receive, starting at a second time after the first time, audio corresponding to an utterance;
        store audio data corresponding to the audio in a first circular buffer, based at least in part on detecting the indicator;
        receive, at a third time after the second time, a signal to process audio; and
        in response to receipt of the signal:
            combine, into combined audio data, at least a portion of the audio data corresponding to the utterance and stored in the first circular buffer prior to receipt of the signal with further audio data corresponding to further audio received after receipt of the signal; and
            send the combined audio data for processing.

6. The computing device of claim 5, wherein the instructions configuring the at least one processor to detect the indicator of impending device activity configure the at least one processor to detect the indicator of impending device activity based at least in part on output from sensors coupled to said at least one processor.

7. The computing device of claim 6, wherein the indicator comprises one or more of an activation of an application that processes audio, a change in incident light intensity, a visual recognition of motion, a visual recognition of a user in proximity to the computing device, visual recognition of a face, a finger proximal to a touch-sensitive display screen, movement of the computing device, an ambient sound, speech, or recognition of a particular speaker.

8. The computing device of claim 5, further comprising instructions further configuring the at least one processor to generate the signal to process audio in response to detection of a pressing of a physical button, a pressing of a virtual button provided via a graphical user interface of the device, or a gesture.

9. The computing device of claim 5, further comprising instructions configuring the at least one processor to:
    calculate an audio correction, prior to receipt of the signal to process audio; and
    apply the audio correction to the further audio data.

10. The computing device of claim 9, further comprising instructions configuring the at least one processor to:

calculate the audio correction based at least in part on second audio data stored in a second circular buffer; and apply the audio correction to the audio data stored in the first circular buffer.

11. The computing device of claim 9, wherein the audio correction comprises one or more of channel normalization or noise reduction.

12. The computing device of claim 5, further comprising instructions configuring the at least one processor to:

recognize a pattern of device activity relating to utilization of captured audio based at least in part on a user history; and compare at least the detected indicator of impending device activity and other data relating to occurrence of the indicator with the recognized pattern, wherein activating the first circular buffer is further based at least in part on the comparison.

13. A non-transitory computer-readable storage medium storing processor-executable instructions for controlling a computing device, comprising:

program code to detect, at a first time, an indicator of impending device activity;

program code to receive, starting at a second time after the first time, audio corresponding to an utterance;

program code to store audio data corresponding to the audio in a first circular buffer, based at least in part on detecting the indicator;

program code to receive, at a third time after the second time, a signal to process audio; and program code to, in response to receipt of the signal:

combine, into combined audio data, at least a portion of the audio data corresponding to the utterance and stored in the first circular buffer prior to receipt of the signal with further audio data corresponding to further audio received after receipt of the signal; and send the combined audio data for processing.

14. The non-transitory computer-readable storage medium of claim 13, wherein the program code to detect the indicator of impending device activity is based at least in part on output from sensors of the computing device.

15. The non-transitory computer-readable storage medium of claim 14, wherein the indicator comprises one or more of an activation of an application that processes audio, a change in incident light intensity, a visual recognition of motion, a visual recognition of a user in proximity to the computing device, visual recognition of a face, a finger proximal to a touch-sensitive display screen, movement of the computing device, an ambient sound, speech, or recognition of a particular speaker.

16. The non-transitory computer-readable storage medium of claim 13, further comprising program code to generate the signal to process audio in response to detection of a pressing of a physical button, a pressing of a virtual button provided via a graphical user interface of the computing device, or a gesture.

17. The non-transitory computer-readable storage medium of claim 13, further comprising:

program code to calculate an audio correction, prior to receipt of the signal to process or record audio; and program code to apply the audio correction to the further audio data.

18. The non-transitory computer-readable storage medium of claim 17, wherein:

the program code to calculate the audio correction is based at least in part on second audio data stored in a second circular buffer; and the program code to apply the audio correction comprises program code to apply the audio correction to the audio data stored in the first circular buffer.

19. The non-transitory computer-readable storage medium of claim 17, wherein the audio correction comprises one or more of channel normalization or noise reduction.

20. The non-transitory computer-readable storage medium of claim 13, further comprising:

program code to recognize a pattern of device activity relating to utilization of captured audio based at least in part on a user history; and program code to compare at least the detected indicator of impending device activity and other data relating to occurrence of the indicator with the recognized pattern, wherein the program code to activate the first circular buffer is further based at least in part on the comparison.

* * * * *